United States Patent [19]

Solcia et al.

[11] Patent Number: 5,151,251
[45] Date of Patent: Sep. 29, 1992

[54] GAS PURIFIER HAVING END OF LIFE DETECTOR

[75] Inventors: Carolina Solcia; Marco Succi, both of Milan, Italy

[73] Assignee: SAES Getters SpA, Milan, Italy

[21] Appl. No.: 702,305

[22] Filed: May 20, 1991

[30] Foreign Application Priority Data

Jun. 26, 1990 [IT]   Italy ............................... 20768 A/90

[51] Int. Cl.⁵ ...................... G01L 9/00; G05D 15/00; B01D 46/00
[52] U.S. Cl. .................................. 422/119; 55/274; 55/DIG. 34
[58] Field of Search ................. 55/274, 523, DIG. 34; 72/730; 422/119

[56] References Cited

U.S. PATENT DOCUMENTS 4,444,727  4/1984  Yanagihara et al. ................ 422/223
4,706,501  11/1987  Atkinson et al. ..................... 73/730
4,925,619  5/1990  Sparrow et al. ...................... 73/730

OTHER PUBLICATIONS

Hammond, C. R., "The Elements", CRC Handbook of Chemistry and Physics, 60th ed., pp. B-4, 11, 15, 1979.

Primary Examiner—Robert J. Warden
Assistant Examiner—Christopher Y. Kim
Attorney, Agent, or Firm—David R. Murphy

[57] ABSTRACT

A gas purifier for impure gas is provided with a sensor of the end of useful life. The purifier has a housing completely filled with a gas sorbing material. The gas sorbing material is capable of reacting with the impurities contained within the impure gas. This reaction results in an expansion of the gas sorbing material which thereby causes the housing to expand.

The purifier also has an impure gas inlet and a purified gas outlet as well as a strain gauge carried by the housing and means for determining the strain on the strain gauge thus determining the end of useful life of the gas sorbing material.

7 Claims, 1 Drawing Sheet

GAS PURIFIER HAVING END OF LIFE DETECTOR

BACKGROUND TO THE INVENTION

Gas purifiers for removing impurities from impure gases are well known. These known purifiers typically have a housing in fluid communication with an inlet and an outlet. An impurity sorbing material is located within the housing.

Considerable difficulty has been encountered in attempting to determine when this impurity sorbing material has come to the end of its life. In general the impurity sorbing material has come to the end of its life when it no longer sorbs the impurities in the impure gas. However it is difficult and expensive to determine the end of life of the impurity sorbing material by measuring the impurities in the outlet gas. For this reason recent attempts to determine the end of life of the impurity sorbing material have been centered around the impurity sorbing material itself. Some prior end of life sensors have been placed in the gas stream but placing the sensor there can cause contamination of the gas stream. Furthermore if the sensor is electrical and is in the gas stream it is necessary to provide the purifier with a feedthrough.

BRIEF OBJECTS OF THE INVENTION

Accordingly it is an object of the present invention to provide an improved gas purifier having an end of life detector which is substantially free of one or more of the disadvantages of prior gas purifiers.

Another object of the present invention is to provide an improved gas purifier having an end of life detector which is outside the gas stream and therefore requires no feed-through.

Still another object of the present invention is to provide an improved gas purifier which can be readily assembled from components widely available.

Additional objects and advantages of the present invention will be readily apparent to those skilled in the art by reference to the following description and drawings wherein:

DESCRIPTION OF THE INVENTION

According to the present invention there is provided a gas purifier for impure gas having an end of life detector. The purifier of the present invention comprises a housing, an impurity-sorbing material in the housing, a gas inlet and outlet and a strain gauge carried by the housing.

The strain gauge can consist of one or more resistances in one or more arms of a Wheatstone bridge which constitutes a means for determining the strain on the strain gauge thereby determining the end of life of the gas sorbing material.

The gas sorbing material is preferably packed tightly within the housing. The impurity sorbing material has the property of reacting with impurities in the impure gas. This reaction causes expansion of the impurity sorbing material which in turn causes the housing to expand. The expansion of the housing is detected by the strain gauge and signals the end of life of the impurity sorbing material in the housing.

The gas purifier of the present invention can be employed to purify all the noble gases in general and is particularly useful for argon. The gas purifier of the present invention can also be employed to purify impure nitrogen or impure hydrogen.

The impurity sorbing material useful in the present invention are commonly sold as getter materials namely Zr, V, Ta, Ti, Th and U, alloys thereof and alloys with other metals. Particularly useful impurity sorbing materials are alloys of Zr, V, and Fe as well as $Zr_2Fe$.

Figure 1:
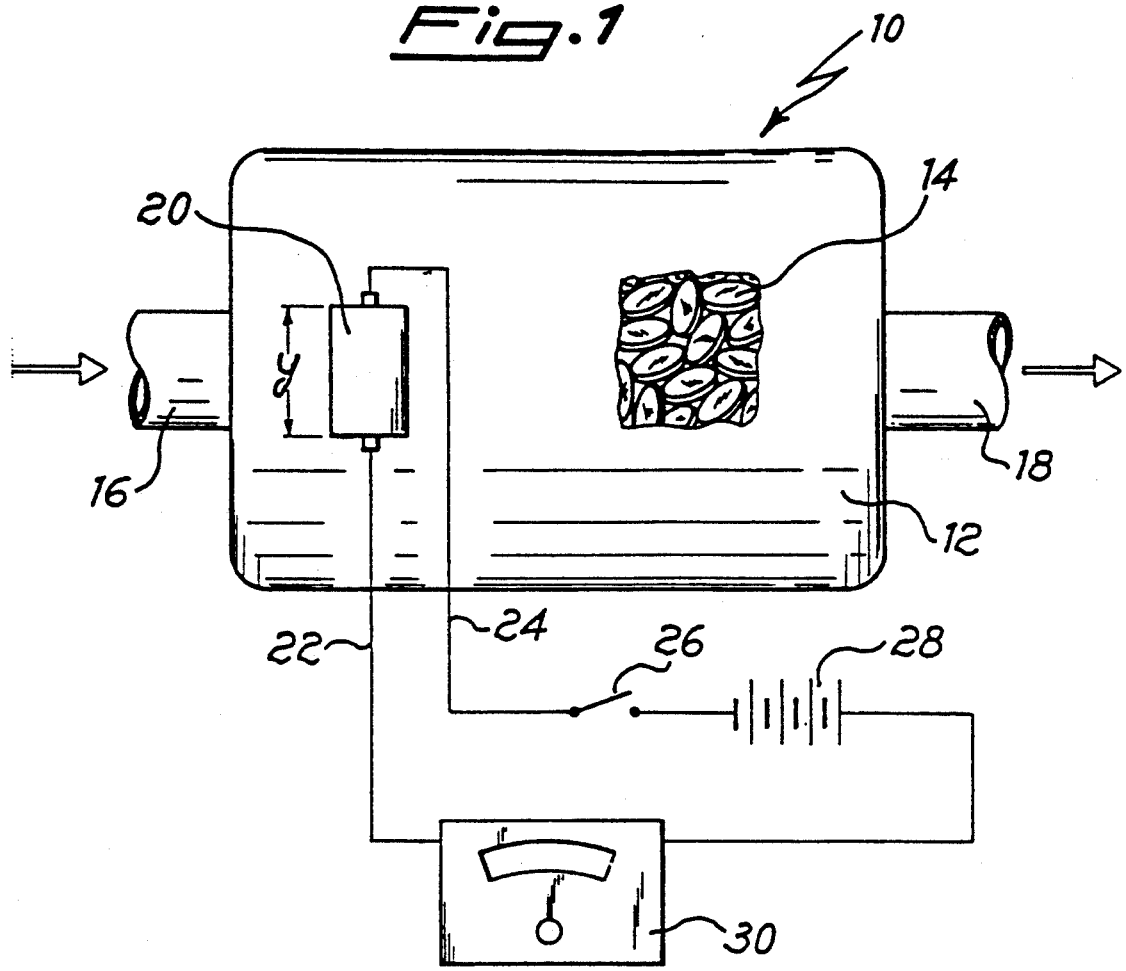
FIG. 1 is a schematic representation of a gas purifier of the present invention.
Figure 2:
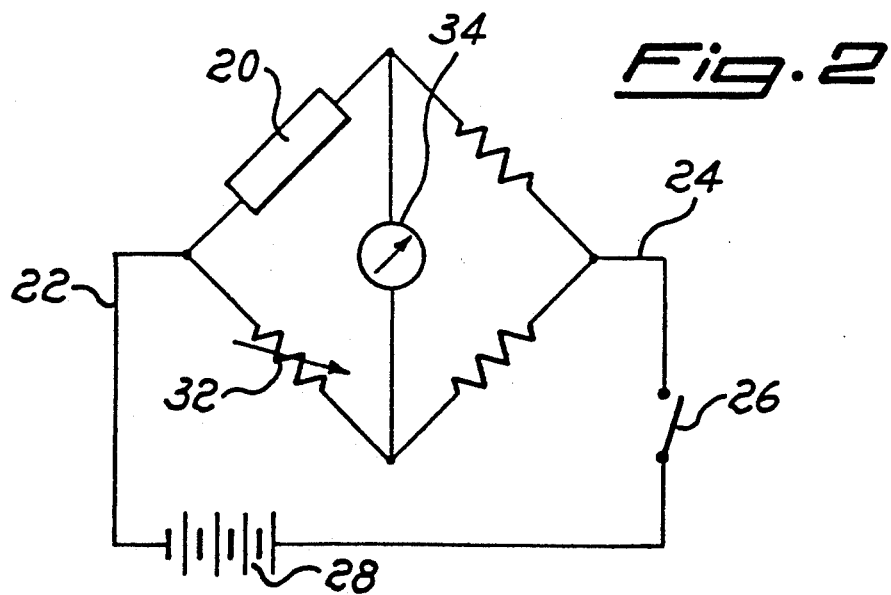
FIG. 2 is a diagram of the electrical circuit shown in FIG. 1.

Referring now to FIGS. 1 and 2 of the drawings there is shown a gas purifier 10 of the present invention. A gas purifier 10 has a housing 12 and an impurity sorbing material 14 within the housing. The interior of the housing 12 is in fluid communication with an impure gas inlet 16 and a purified gas outlet 18. A strain gauge 20 is carried by the housing 12 which has a cylindrical surface, the strain gauge 12 adheres to the circumference of the cylindrical housing. The strain gauge 20 performs as a variable resistor and is connected to conductors 22, 24. The conductors 22 and 24 are connected to a controller 30. A power source 28 is also connected the controller 30 through a switch 26. The controller 30, power source 28, switch 26 and conductors 22, 24 constitute means for determining the strain on the strain gauge 20.

Referring now to FIG. 2 there is shown the Wheatstone bridge circuit when the strain gauge 20 consists of the resistor of only one arm of the bridge, the major part of which is within the controller 30. In operation the switch 26 is closed and the resistance of the resistor 32 is adjusted until the galvanometer 34 reads zero. As the material 14 sorbs impurities it expands causing the distance "y" to increase changing the resistance of the strain gauge 20. Readjustment of the resistor 32 until the galvanometer 34 again reads zero gives an indication of the expansion of the material 14 and therefore the end of life of the purifier.

The operation of the Wheatstone bridge is described by K. Hoffmann in the book entitled "Applying the Wheatstone Bridge Circuit" available from Hottinger Baldwin Messtechnik, Postfach 4235, D-6100 Darmstadt 1, Federal Republic of Germany.

A suitable controller 30 is that called Portable strain indicator Model P-3500, available from Measurements Group, Inc. P. O. Box 27777, Raleigh, N.C. 27611, U.S.A.

Although the present invention has been described with particular reference to one preferred embodiment it will be understood that the changes and modifications can be made without departing from the spirit and scope of the invention as described above and as defined in the appended claims.

What is claimed is:

1. A gas purifier for impure gas having an end of life detector, said purifier comprising:
   A. a housing; and
   B. an impurity-sorbing material packed within the housing wherein said impurity-sorbing material has the property of reacting with impurities in the impure gas wherein the reaction causes expansion of the impurity-sorbing material, thereby causing the housing to expand; and
   C. an impure gas inlet in fluid communication with the housing; and D. a purified gas outlet in fluid communication with the housing; and E. a strain gauge carried by the housing; and F. means for determining the strain of the strain gauge thereby determining the end of life of the impurity-sorbing material.

2. The gas purifier of claim 1 wherein the housing is cylindrical.

3. The gas purifier of claim 1 wherein the housing is cylindrical and wherein the strain gauge adheres to the circumference of the cylindrical housing.

4. The gas purifier of claim 1 wherein the impurity sorbing material is an alloy of Zr, V, and Fe.

5. The gas purifier of claim 1 wherein the impurity sorbing material is $Zr_2Fe$.

6. The gas purifier of claim 1 wherein the means for determining the strain of the strain gauge is a Wheatstone bridge.

7. A argon purifier for impure argon having an end of life detector, said purifier comprising:

A. a cylindrical housing; and

B. an impurity-sorbing material packed within the housing wherein said impurity-sorbing material has the property of reacting with impurities in the impure argon wherein the reaction causes expansion of the impurity-sorbing material, thereby causing the housing to expand;

wherein the impurity-sorbing material is an alloy of Zr, V, and Fe and

C. an impure argon inlet in fluid communication with the housing; and

D. a purified argon outlet in fluid communication with the housing; and

E. a strain gauge carried by the housing and adhering to the circumference of the housing; and F. means including a Wheatstone bridge for determining the strain of the strain gauge thereby determining the end of life of the impurity-sorbing material.

* * * * *